United States Patent
Zellner

(10) Patent No.: US 7,334,090 B2
(45) Date of Patent: Feb. 19, 2008

(54) METHODS, SYSTEMS, AND STORAGE MEDIUMS FOR PROVIDING INFORMATION STORAGE SERVICES

(75) Inventor: Samuel N. Zellner, Dunwoody, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 255 days.

(21) Appl. No.: 10/740,155

(22) Filed: Dec. 17, 2003

(65) Prior Publication Data

US 2005/0138305 A1    Jun. 23, 2005

(51) Int. Cl.
*G06F 12/00* (2006.01)
(52) U.S. Cl. .................. 711/154; 709/203; 709/206; 725/46
(58) Field of Classification Search ............. 711/154
See application file for complete search history.

(56) References Cited

U.S. PATENT DOCUMENTS 5,913,026 A * 6/1999 Bleidt et al. .............. 709/201
2003/0078934 A1 * 4/2003 Cappellucci et al. ....... 707/101
2003/0110500 A1 * 6/2003 Rodriguez ................. 725/46
2003/0191804 A1 * 10/2003 Yasuda et al. ............. 709/203
2004/0128356 A1 * 7/2004 Bernstein et al. .......... 709/206
2004/0205028 A1 * 10/2004 Verosub et al. ............ 705/59
2005/0044191 A1 * 2/2005 Kamada et al. ............ 709/223

OTHER PUBLICATIONS

Microsoft Computer Dictionary, Page relevant to "Content data".*

* cited by examiner

*Primary Examiner*—Donald Sparks
*Assistant Examiner*—Hashem Farrokh
(74) *Attorney, Agent, or Firm*—Cantor Colburn LLP

(57) ABSTRACT

Embodiments relate to a method, system, and storage medium for providing information storage services to a service application user via a service provider. The method includes presenting options to the service application user operable for specifying a duration of time for storing an information element at a remote location. The method further includes receiving a selection from the service application user in response to options presented and assigning a storage period to the information element based upon the selection. Embodiments also include a system and a storage medium.

23 Claims, 3 Drawing Sheets

METHODS, SYSTEMS, AND STORAGE MEDIUMS FOR PROVIDING INFORMATION STORAGE SERVICES

BACKGROUND OF THE INVENTION

Embodiments of the invention relate generally to electronic data storage, and more particularly, to methods, systems, and storage mediums for providing information storage services.

The nature of information used in applications has changed dramatically in recent years. Improvements in computer processors displays, and image capturing systems have transformed information used in applications from simple ASCII text to rich multimedia. Providing storage for this data can be very costly for the service/storage provider. Administrators of these storage systems utilize various means for controlling and managing the amount of information that can be stored. For example, electronic messaging service providers offer message storing up to a predetermined storage limit, usually measured in kilobytes. Once the message inbox has reached its limits, no additional messages may be stored until the user purges the inbox. This method places a burden on the user to erase messages no longer desired in order to be able to store additional messages. Moreover, this method can be contrary to the objectives of the service provider since a user with a full mailbox cannot receive new messages that would otherwise generate further usage. This affects service providers whose pricing models are linked to usage. A voicemail service provider typically offers storage for voicemails for a limited period of time, usually five days. Once the time limit has been reached, the voicemails are automatically chronologically deleted by the voicemail service provider. This method eliminates the problems resulting from having a full voice mailbox, but is not particularly user friendly. As a result, many users lose important messages or are forced to resort to spending significant amounts of time periodically resaving messages.

Oftentimes individuals need to store this data longer than the time periods (or capacity limits) set by a service provider. What is needed, therefore, is a way to provide information storage services for users in a manner that is more friendly and consistent with the service provider's business objectives.

SUMMARY OF THE INVENTION

Embodiments relate to methods, systems, and storage mediums for providing information storage services. Embodiments relate to a method, system, and storage medium for providing information storage services to a service application user via a service provider. The method includes presenting options to the service application user operable for specifying a duration of time for storing an information element at a remote location. The method further includes receiving a selection from the service application user in response to options presented and assigning a storage period to the information element based upon the selection. Embodiments also include a system and a storage medium.

Embodiments further include a system for providing information storage services to a service application user via a service provider. The system includes a server in communication with a service provider and at least one service application user device, an information storage system in communication with the service provider, and a data repository in communication with the server. The data repository stores consumer records associated with service application users and information elements. The information storage system presents options to a service application user operable for specifying a duration of time for storing an information element in the data repository. The data repository is remotely located from the service application user device. The information storage system also receives a selection from the service application user in response to the options presented and assigns a storage period to the information element based upon the selection.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

The information storage system of the invention allows users of information to acquire storage of information elements associated with a service application in a manner consistent with their needs. The information storage system may be applied to a variety of service applications such as messaging applications (e.g., email, instant messaging, and chat), voicemail services, data warehousing of electronic data (e.g., digital images, text files, documents, etc.), television programming storage services, as well as other types of applications. Information elements are specific to the service application. For example, information elements for a messaging application may comprise email messages, instant messages, and chat discussions. The storage of these information elements is based upon time factors that may be selected from time periods provided by a service provider, or may be customized by the user.

Figure 1:
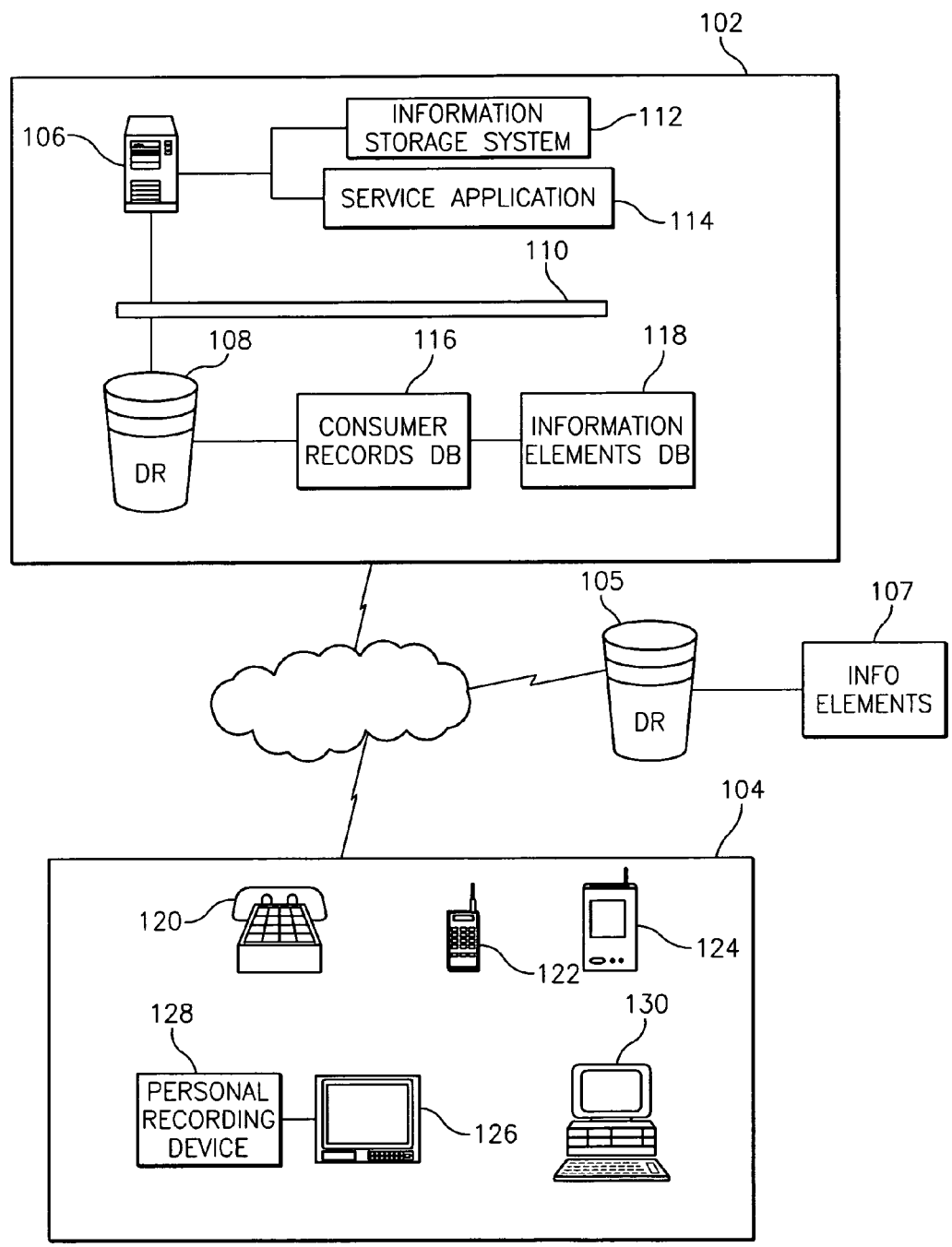
FIG. 1 is a block diagram of a system upon which the information storage system is implemented in exemplary embodiments of the invention.

The information storage system is executed via a system such as that depicted in FIG. 1. FIG. 1 includes a host system 102 and a group of communications devices 104 that are in communication by one or more networks. The type of network employed by the information storage system is determined by the type of service application being implemented, as well as the capabilities of the communication devices utilized as described further herein. The network may comprise a circuit-switched network (public switched telephone network), a wireless network (e.g., a cellular communications network, a fixed wireless network, a wireless local area network, etc.), a packet-switched network (local area network, wide area network, Internet network, etc.), or other suitable means of networking architecture.

Host system 102 includes a server 106 and a data repository 108, in communication with each other via a network 110. Server 106 may comprise a high-powered multiprocessor computer device including web server and applications server software for receiving requests from communication devices 104 to process information elements and exchange information between devices 104 and host system 102 via the Internet or other network. Embodiments include server 106 executing the information storage system 112 of the invention as well as one or more service applications 114. As indicated above, a service application may comprise a messaging application, a voicemail service, data warehousing of electronic data, television programming storage service, as well as other types of applications. The information storage system 112 may be integrated into an existing service application 114 or may be a stand-alone product that is offered by host system 102. In yet further embodiments, one or more of devices 104 may execute service application 114 and/or information storage system 112, alone or in combination with server 106.

Data repository 108 stores information utilized by host system 106 such as consumer records 116 and information elements. Data repository 108 is logically addressable by server 106. In alternate embodiments, data repository 108 and server 106 comprise a single unit such as a mainframe computer that includes applications server and web server technology for implementing the features and functions of the information storage system described herein.

Consumer records database 116 stores information relating to the service plans and billing records associated with users of the information storage system. Consumer records database 116 further stores addressing information for users for identifying and distinguishing each user and for billing purposes. Further, various levels of service plans and options may be established for users as a value added service.

Information elements database 118 stores information associated with the service plan(s) offered by the service provider of host system 102. For example, host system 102 may be an email service provider where service application 114 is an email program and information elements comprise email messages stored on behalf of service users. In alternate embodiments, information elements are not stored by host system 102, but rather by an information storage provider as shown in FIG. 1 at 105 and 107. Data repository 105 stores information elements 107 on behalf of service users of devices 104. Host system 102 provides information storage services to users in conjunction with a particular service and stores the information elements remotely at information storage provider data repository 105.

Communications devices 104 represent the types of equipment employed by users of the information storage system to communicate with host system 102 as well as to access the features of the information storage system. Communications devices 104 may include a wireline telephone 120, a wireless telephone 122, a personal digital assistant (PDA) 124, a network-enabled television 126 and personal recording device 128, and a computer device 130.

Communications device 120 refers to a wireline telephone that utilizes a Public Switched Telephone Network (PSTN) carrying analog voice data. Communications device 120 subscribes to a service application provided by host system 102, such as a voicemail system.

Communications device 122 refers to a device that sends communications over a wireless network. Communications device 122 may be a wireless mobile telephone that communicates via a cell tower and mobile switching center, which, in turn, communicates to other networks via a central office. Communications device 122 subscribes to a service application provided by host system 102, such as voicemail. Mobile telephones often include graphics features such as digital photography capabilities. For these communications devices, service applications subscribed to by a user may include storage of digital images in addition to, or in lieu of, voicemail services.

Communications device 124 refers to a mobile computing device that includes graphics capabilities which support the features of the information storage system of the invention. Communications device 124 may be a personal digital assistant (PDA) with networking capability such as a web browser and an Internet Service Provider subscription for allowing the PDA 124 to communicate digitally with other communications devices.

Communications device 126 refers to an Internet-enabled television that supports the features of the information storage system. Users can access the Internet via television remote control or other input device. Personal recording device 128 is associated with communications device 126 and relates to equipment that enables a user to select and record programming under a service plan with a provider. For example, a user of personal recording device 128 may subscribe to the TiVo® system provided by TiVo, Inc. of Alviso, Calif., or other similar television service provider. Information elements associated with this service may include storing user-selected programming in database 118.

Communications device 130 refers to a device that communicates through a packet-switched network. For example, communications device 130 may be a personal computer, laptop, or workstation that executes a messaging application and subscribes to a messaging service. Alternatively, communications device 130 may subscribe to a data storage service that warehouses data, files, and other information.

The communications infrastructure required for enabling communications devices 120-130 are well known and will be understood by those skilled in the art.

The functionality of the information storage system may also be extended to telephony applications such as call receipt, call waiting, and call forwarding. It may also be extended to applications such as email, unified messaging, facsimile, video conferencing, audio conferencing, call center applications utilizing caller information to retrieve information or update databases, sending originator information through a communications channel not associated with the recipient of the message content (e.g., information storage through instant messaging or a web browser), and sharing OCI information between devices, among others.

Figure 2:
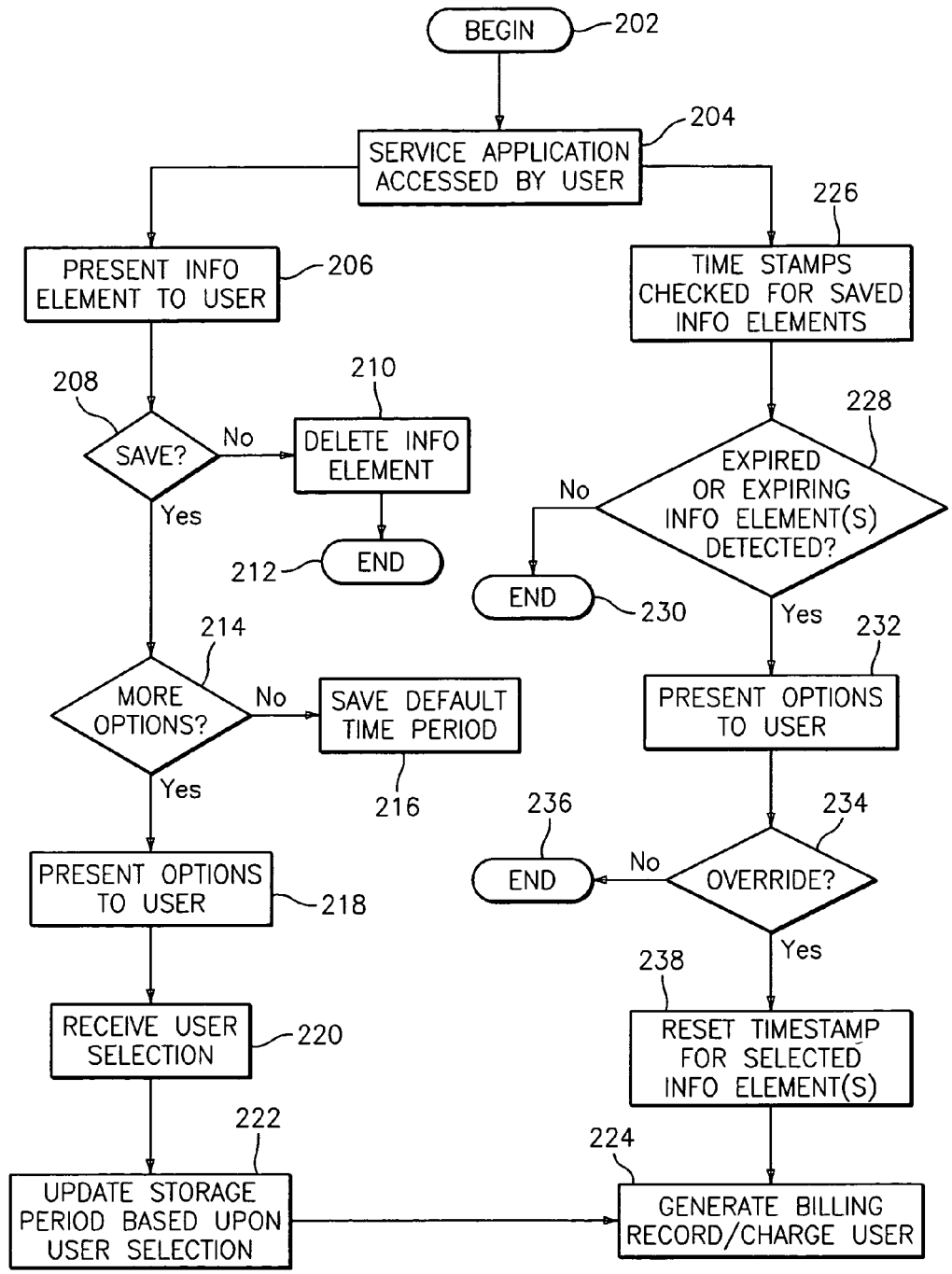
FIG. 2 is a flowchart describing the process of implementing the information storage system in exemplary embodiments of the invention.
Figure 3:
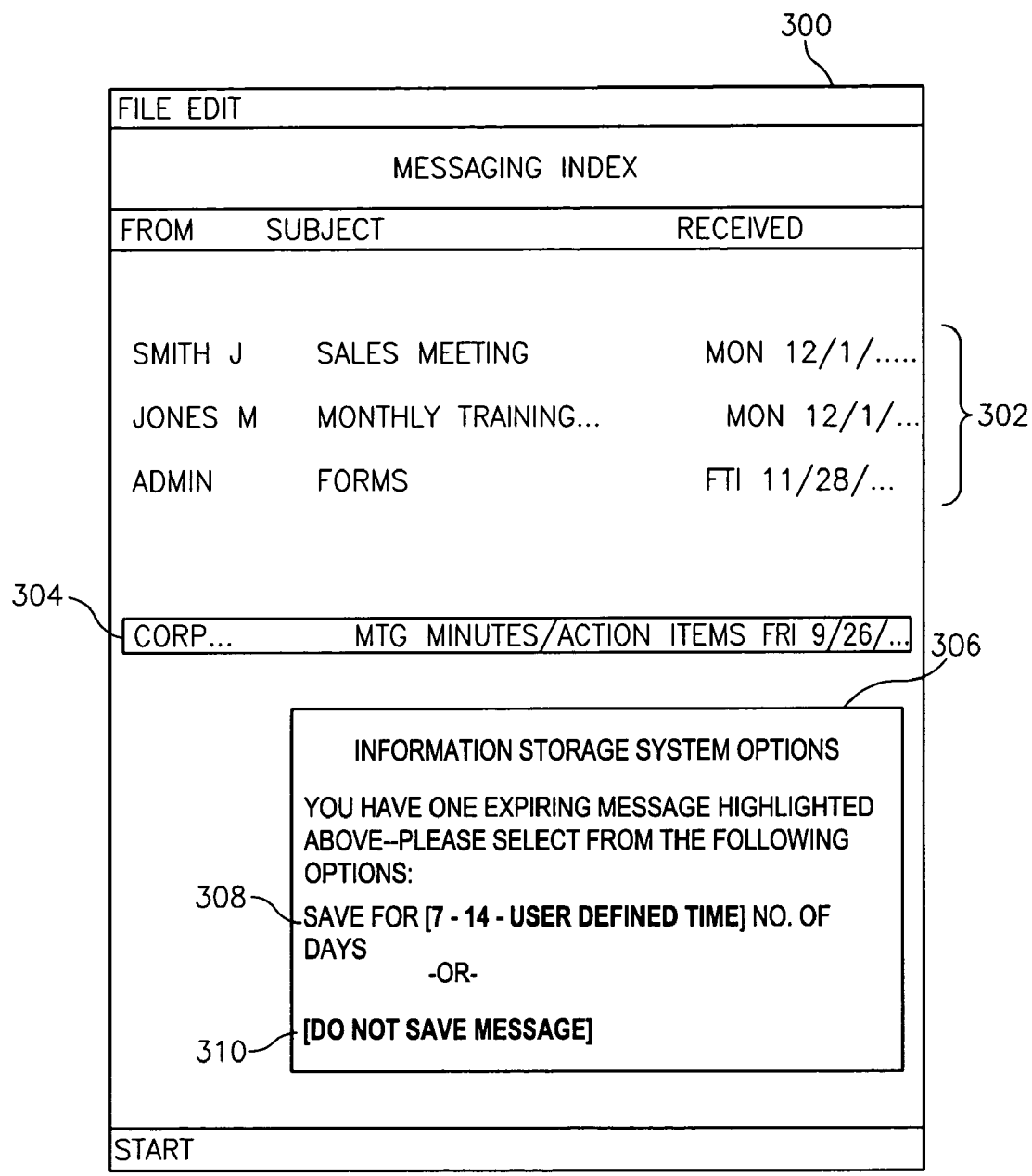
FIG. 3 is a sample user interface presented by the information storage system as seen by an end user of a service application in exemplary embodiments of the invention.

The information storage system is implemented over one or more of networks as described in FIGS. 2 and 3. The information storage system can be implemented in a variety of communications environments including, for example, a data network such as the Internet, a voice communications network, and wireless networks.

Turning now to FIG. 2, implementation of the information storage system for a service application will now be described. Embodiments of the process include prompting a user to select storage options for a current information element accessed, as described in steps 202-224. Embodiments of the process also include periodically evaluating stored information elements and notifying the user of those which are expiring in steps 202-204 and 226-236. In this manner, the user may be given an option to address the handling of these expiring information elements before they are deleted. These and other features will now be described. At step 202 the information storage system process begins when a user accesses a service application at step 204. As indicated above, the service application may be a messaging application, a voicemail application, a television service application, etc. A new information element is presented to the user at step 206. For example, in a voicemail system environment, the information element would be a new voicemail message received at the service provider host system 102 and presented to the user at a communication device such as telephone 120, mobile telephone 122, etc. The user is then queried to save the information element at step 208. Using the example above, a recording in the voicemail system queries the user to save or delete the voicemail and provide instructions. The user may decide to dispose of the voicemail, for example, by depressing a key on the keypad of device 120 or by other suitable input means, depending on the nature of the communications device used. In an email system environment, the information element would be a new email message received at the service provider host system 102 and presented to the user at a communications device such as PDA 124 or personal computer 130. The user would then be queried by the information storage system to save the new message via instructions provided on the display screen of PDA 124 or personal computer 130.

If the user does not wish to save the information element at step 208, the information storage system deletes the information element at step 210 and the process ends at step 212. If the user, on the other hand, wishes to save the information element at step 208, the user is queried to select from additional options at step 214. Again, the user is provided with instructions operable for indicating the user's intent to save the information element for a default period of time or to select from a list of options added by the information storage system. If the user indicates that no additional options are desired at step 214, the information element is saved for a default period of time at step 216. Otherwise, the user is presented with additional options for handling the storage of the information element at step 218. Embodiments of handling the storage of information elements may include providing element ratings selections in which a user identifies an information element as important, standard, bulk, or other ranking criteria. The element ratings determine the amount of the time an information element will be stored. For example, an information element rated as 'important' may be stored for 14 days by the information storage system while a 'standard'-rated information element may be stored for only 7 days. The user would be prompted to enter a selection by any input means associated with the communications device and service application.

Alternative embodiments for handling the storage of the information elements include prompting a user to select from a pre-defined set of storage time periods (e.g., 7 days, 14 days, 21 days) as well as providing an option that allows the user to specify a custom period of time for storage. The information storage system receives the user selection at step 220 and updates the storage period in information elements database 118 at step 222. In a voicemail application, this may be accomplished by resetting the time stamp associated with a voicemail. In other applications, an expiration date may be assigned to the information element. A billing record for the information element is generated for charging the user for the amount of storage time selected at step 224. This information is stored in consumer records database 116.

As described above, the information storage system periodically evaluates stored information elements and notifies the user of those elements that are about to expire. The information storage system provides the user with options for extending the length of time an information element may be stored. At step 202, the process begins when a user accesses a service application at step 204. The information storage system checks database 118 for information elements associated with the user that are about to expire at step 226. If there are no expiring information elements detected at step 228, the process ends. Otherwise, options are presented to the user at step 232. Options include overriding the storage limits previously set by the user for the information element or allowing the information element to expire. If the user indicates that the information element should not be overridden at step 234, the element is allowed to expire, deleted from storage, and the process ends at step 236. Otherwise, the information storage system resets the timestamp for the selected information element to coincide with the user's preferences at step 238. Again, a billing record is generated for this extended storage period and charged to the user at step 224.

A sample computer screen window of a communications device illustrates the process steps provided above with respect to an email service application. The window 300 of FIG. 3 depicts a user's email inbox with three current messages 302 and one expiring message 304. The information storage system identifies the message that is about to expire and brings it to the user's attention at the time the user accesses the inbox. Window 300 further illustrates a sub-window 306 that provides instructions to the user for specifying how the expiring message should be handled. The user may select a period of time 308 to extend the storage of the message or may allow the message to expire 310. Further embodiments include providing the user with instructions for specifying a custom defined amount of time selectable by the user, as well as providing 'unlimited' storage for a pre-set fee. For example, the information storage system may allow a user to store an unlimited number of messages for one month for a fee of ten dollars. These and other options are contemplated by the information storage system.

The information storage system allows users of information to acquire storage of information elements associated with a service application in a manner consistent with their needs. The information storage system may be applied to a variety of service applications for information elements specific to a particular service application. The storage of these information elements is based upon time factors that may be selected from time periods provided by a service provider, or may be customized by the user.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing information storage services to a service application user via a service provider, the method comprising:
   presenting options to the service application user operable for specifying a duration of time for storing an information element at a location remote from the service application user, the information element generated by the service application user via a service application in response to a voice communication;
   receiving a selection from the service application user in response to the presented options;
   assigning a storage period to the information element based upon the selection; and
   rating the information elements by duration of storage time, the ratings of the information elements including:
   important;
   standard; and
   bulk;
   wherein the service application comprises at least one of:
      an email messaging application;
      an instant messaging application; and
      a voicemail system;
   wherein the voice communication occurs via the at least one of the email messaging application, the instant messaging application, and the voicemail system.

2. The method of claim 1, further comprising:
   notifying the service application user before the storage period expires; and
   extending the storage period upon a request to do so by the service application user.

3. The method of claim 1, further comprising storing the information element in a data repository for the storage period, the data repository associated with at least one of:
   the service provider; and
   a remote information storage provider.

4. The method of claim 2, wherein the information storage services are integrated with a service application, the service application executed by at least one of:
   a device operated by the service application user; and
   a server operated by the service provider.

5. The method of claim 4, wherein the device includes at least one of a:
   computer;
   mobile telephone;
   personal digital assistant; and
   networked television.

6. The method of claim 1, wherein the duration of time includes at least one of:
   a choice of pre-set time periods provided by the service application;
   a user-defined time period; and
   an unlimited time period.

7. The method of claim 1, wherein the information element comprises at least one of:
   an electronic message;
   a voicemail message;
   a television program;
   a video file;
   an image file;
   a document;
   a database record; and
   a data file.

8. The method of claim 1, wherein a size of the information element is limited to a pre-established number of bytes.

9. The method of claim 2, further comprising billing the service application user in accordance with the selection.

10. The method of claim 9, further comprising:
    rating the information elements by duration of storage time; and
    assigning billing fees in accordance with the rating.

11. A storage medium including machine-readable computer program code for providing information storage services to a service application user via a service provider, the storage medium including instructions for causing a computer to implement a method comprising:
    presenting options to the service application user operable for specifying a duration of time for storing an information element at a location remote from the service application user, the information element generated by the service application user via a service application in response to a voice communication;
    receiving a selection from the service application user in response to the presented options;
    assigning a storage period to the information element based upon the selection; and
    rating the information elements by duration of storage time, the ratings of the information elements including:
    important;
    standard; and
    bulk;
    wherein the service application comprises at least one of:
       a messaging application; and
       a voicemail system;
    wherein the voice communication occurs via the at least one of the messaging application and the voicemail system, and the information element comprises at least one of an email message, an instant message, and a voicemail message.

12. The storage medium of claim 11, further comprising instructions for causing the computer to implement:
    notifying the service application user before the storage period expires; and
    extending the storage period upon a request to do so by the service application user.

13. The storage medium of claim 11, further comprising instructions for causing the computer to implement:
    storing the information element in a data repository for the storage period, the data repository associated with at least one of:
    the service provider; and
    a remote information storage provider.

14. The storage medium of claim 12, wherein the information storage services are integrated with a service application, the service application executed by at least one of:
    a device operated by the service application user; and
    a server operated by the service provider.

15. The storage medium of claim 14, wherein the device includes at least one of a:
- computer;
- mobile telephone;
- personal digital assistant; and
- networked television.

16. The storage medium of claim 11, wherein the duration of time includes at least one of:
- a choice of pre-set time periods provided by the service application;
- a user-defined time period; and
- an unlimited time period.

17. The storage medium of claim 11, wherein the information element comprises at least one of:
- a television program;
- a video file;
- an image file;
- a document;
- a database record; and
- a data file.

18. The storage medium of claim 11, wherein a size of the information element is limited to a pre-established number of bytes.

19. The storage medium of claim 12, further comprising instructions for causing the computer to implement:
- billing the service application user in accordance with the selection.

20. The storage medium of claim 19, further comprising instructions for causing the computer to implement:
- rating the information elements by duration of storage time; and
- assigning billing fees in accordance with the rating.

21. A system for providing information storage services, comprising:
- a server in communication with a service provider and at least one service application user device;
- an information storage system in communication with the service provider;
- a data repository in communication with the server, the data repository storing:
  - consumer records associated with service application users; and
  - information elements;
- wherein the information storage system performs:
  - presenting options to at least one of the service application users operable for specifying a duration of time for storing an information element in the data repository, the data repository remotely located from the service application user device, the information element generated by the service application user via a service application in response to a voice communication;
  - receiving a selection from the service application user in response to the presented options;
  - assigning a storage period to the information element based upon the selection;
  - notifying the service application user before the storage period expires; extending the storage period upon a request to do so by the service application user;
  - billing the service application user in accordance with the selection;
  - rating the information elements by duration of storage time; and
  - assigning billing fees in accordance with the rating;
- wherein ratings of the information elements include:
  - important;
  - standard; and
  - bulk;
    - wherein the service application comprises at least one of:
      - an email messaging application;
      - an instant messaging application; and
      - a voicemail system;
        - wherein the voice communication occurs via the at least one of the email messaging application, the instant messaging application, and the voicemail system.

22. The system of claim 21, wherein the duration of time includes at least one of:
- a choice of pre-set time periods provided by a service application;
- a user-defined time period; and
- an unlimited time period.

23. The system of claim 21, wherein the information element comprises at least one of:
- an electronic message;
- a voicemail message;
- a television program;
- a video file;
- an image file;
- a document;
- a database record; and
- a data file.

* * * * *